US012234739B2

(12) United States Patent
Homison et al.

(10) Patent No.: US 12,234,739 B2
(45) Date of Patent: Feb. 25, 2025

(54) SEMI-FLOATING TURBINE NOZZLE RING

(71) Applicant: Transportation IP Holdings, LLC, Norwalk, CT (US)

(72) Inventors: Christopher Homison, Wattsburg, PA (US); Louis Kobielski, Sherman, NY (US); Timothy Blackhurst, Erie, PA (US)

(73) Assignee: Transportation IP Holdings, LLC, Norwalk, CT (US)

(*) Notice: Subject to any disclaimer, the term of this patent is extended or adjusted under 35 U.S.C. 154(b) by 0 days.

(21) Appl. No.: 18/148,291

(22) Filed: Dec. 29, 2022

(65) Prior Publication Data

US 2023/0258100 A1 Aug. 17, 2023

Related U.S. Application Data

(60) Provisional application No. 63/268,093, filed on Feb. 16, 2022.

(51) Int. Cl.

| | |
|---|---|
| ***F01D 17/16*** | (2006.01) |
| *F01D 9/04* | (2006.01) |
| *F04D 17/10* | (2006.01) |
| *F04D 29/44* | (2006.01) |

(52) U.S. Cl.

CPC ............ *F01D 17/165* (2013.01); *F01D 9/045* (2013.01); *F04D 17/10* (2013.01); *F04D 29/444* (2013.01); *F05D 2220/40* (2013.01); *F05D 2240/128* (2013.01); *F05D 2260/38* (2013.01)

(58) Field of Classification Search

CPC ........ F04D 29/444; F04D 17/10; F01D 9/045; F01D 25/24; F01D 17/16; F01D 17/165; F05D 2260/38; F05D 2220/40; F05D 2240/128

See application file for complete search history.

(56) References Cited

U.S. PATENT DOCUMENTS

| | | | | |
|---|---|---|---|---|
| 4,659,295 | A * | 4/1987 | Burdette | F02B 37/24 415/164 |
| 6,168,375 | B1 * | 1/2001 | LaRue | F04D 29/444 415/146 |
| 8,662,833 | B2 * | 3/2014 | Wengert | F02C 6/12 415/206 |
| 9,163,557 | B2 * | 10/2015 | Blümmel | F02B 37/225 |
| 10,927,698 | B2 * | 2/2021 | Micanek | F02B 37/225 |
| 2017/0335758 | A1 * | 11/2017 | Giselmo | F02B 37/24 |

* cited by examiner

*Primary Examiner* — David E Sosnowski
*Assistant Examiner* — Arthur Paul Golik
(74) *Attorney, Agent, or Firm* — K&L Gates LLP

(57) ABSTRACT

Various methods and systems are provided for an open vane nozzle for a turbine. In one example, the turbine may include at least one bias device arranged at an interface between a nozzle ring and a turbine shroud. The at least one bias device may be configured to exert an axial force on the nozzle ring to maintain contact between vane tips of the nozzle ring and a volute wall.

5 Claims, 6 Drawing Sheets

SEMI-FLOATING TURBINE NOZZLE RING

PRIORITY

The present application claims priority to U.S. Provisional Application No. 63/268,093, entitled "SEMI-FLOATING TURBINE NOZZLE RING", and filed on Feb. 16, 2022. The entire contents of the above-listed application are hereby incorporated by reference for all purposes.

BACKGROUND

Technical Field

Embodiments of the subject matter disclosed herein relate to a vaned ring for a turbocharger.

DISCUSSION OF ART

Vehicles may include an internal combustion engine to combust mixtures of fuel and air. In some examples, power output by the engine may be augmented by compressing intake air prior to combustion at the engine, thereby increasing air charge, e.g., a density of oxygen molecules, and allowing a corresponding amount of injected fuel to be increased. Compression of intake air may be achieved by implementing a turbocharger in the vehicle, with a compressor of the turbocharger coupled to an air intake system of the engine and a turbine of the turbocharger coupled to an exhaust system of the engine. The turbine and compressor are connected by a shaft and rotation of the turbine, as driven by exhaust gas flow, drives rotation of the compressor.

For a radial turbocharger, vaned rings may be included at the compressor (e.g., a diffusor) and at the turbine (e.g., a nozzle ring). At the turbine, performance of the turbine flow stage may be adversely affected, particularly during transient operation, when gas flow bypasses an open vane nozzle ring by flowing over tips of the vanes. For example, in order to accommodate thermally driven axial growth of the vanes during turbocharger operation, an axial length of the vanes may be selected to provide clearance between the tips of the vanes and a wall of the turbine shroud, through which exhaust gas may leak. Thermal expansion may also cause relative movement between a base of the nozzle ring and the turbine shroud wall.

As a result of the issues described above, an open vane nozzle ring may experience high stress, especially during transient ramp-up operation, at the vanes and surfaces in contact with the vanes. An efficiency of the flow stage may be reduced due to gaps at the vane tips, particularly during steady-state operation, and gas flow on the open vane nozzle ring may impose a rotational force that demands sufficient resistance by a mounting mechanism of the nozzle ring to inhibit rotation of the nozzle ring. It may be desirable to have a nozzle ring that differs from those that are currently available.

BRIEF DESCRIPTION

In one embodiment, a turbine may include at least one bias device arranged at an interface between a nozzle ring and a turbine shroud, the at least one bias device configured to exert an axial force on the nozzle ring to maintain contact between vane tips of the nozzle ring and a volute wall. The nozzle ring may thereby accommodate thermal expansion of the plurality of vanes without incurring gas flow losses at the vane tips.

DETAILED DESCRIPTION

Figure 1:
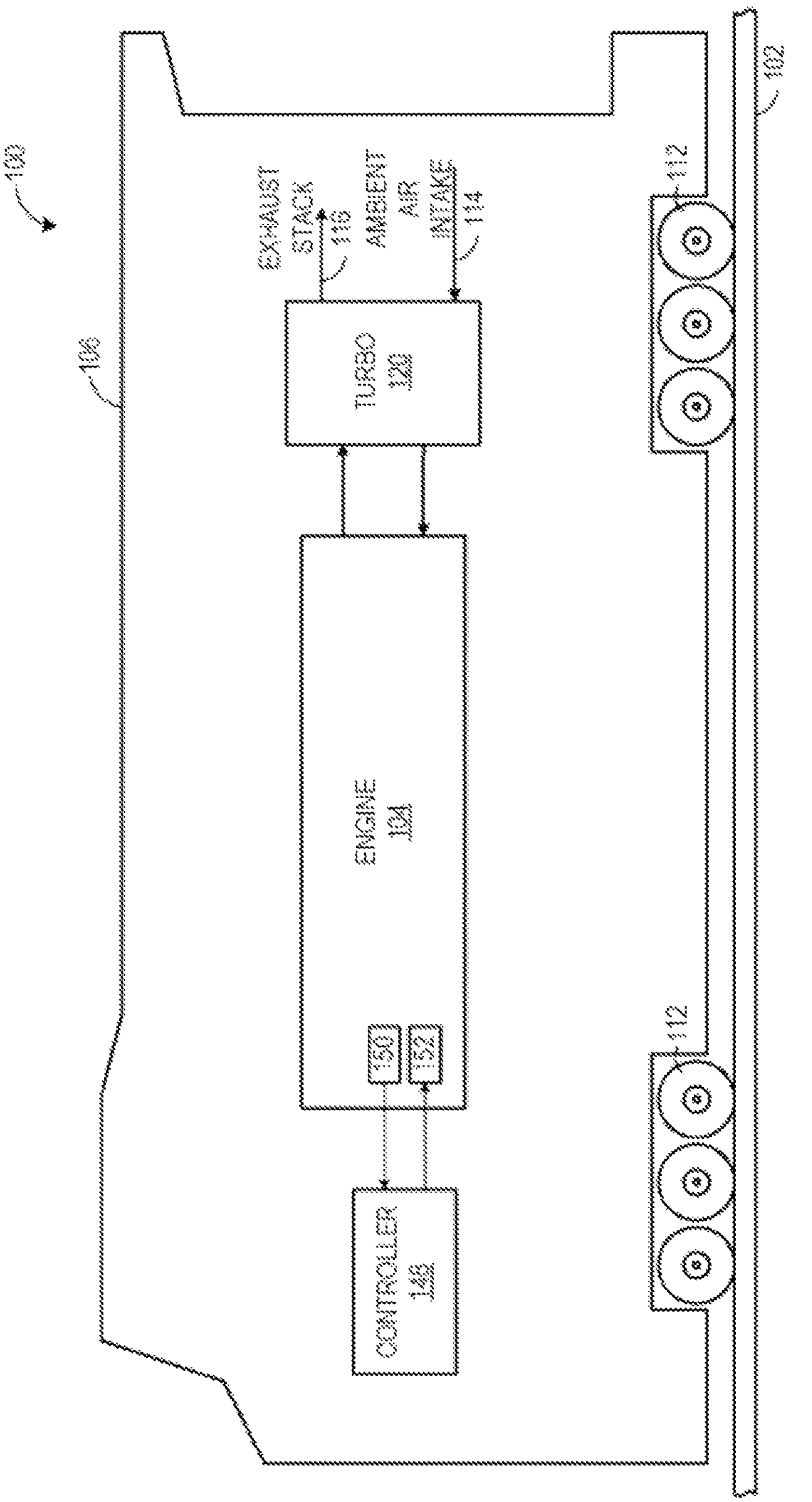
FIG. 1 shows an example embodiment of a vehicle having a turbocharger.

Embodiments of the invention are disclosed in the following description and relate to methods and systems for a turbocharger for a vehicle. More specifically, the description herein relates to a nozzle ring for a turbine of the turbocharger. The turbocharger may be useful in a multi-fuel system of an internal combustion engine (ICE). The ICE may operate via a combination of different fuels. These fuels may have relatively different amounts of carbon. In one example, the ICE may be a multi-fuel engine configured to combust a plurality of fuels. Each of the plurality of fuels may be stored in separate fuel tanks. In one embodiment, one or more of the fuels and its corresponding fuel tank may be housed in a different fuel tank including a different fuel. In one example, a gaseous fuel tank comprising a gaseous fuel may be arranged within an interior volume of a liquid fuel tank comprising a liquid fuel.

The ICE may combust one or more of gasoline, diesel, hydrogenation-derived renewable diesel (HDRD), alcohol(s), ethers, ammonia, biodiesels, hydrogen, natural gas, kerosene, syn-gas, and the like. The plurality of fuels may include gaseous fuels, liquid fuels, and solid fuels, alone or in combination. A substitution rate of a primary fuel of the ICE with a secondary fuel may be determined based on a current engine load. In one embodiment, the substitution rate may correspond to an injection amount of a fuel with a relatively lower carbon content or zero carbon content (e.g., hydrogen gas or ammonia). As the substitution rate increases, the relative proportion of fuel with the lower or zero carbon content increases and the overall amount of carbon content in the combined fuel lowers. Additionally or alternatively, the substitution rate may correspond to an injection amount or delivery of a gaseous fuel relative to a liquid fuel.

In one example, the ICE may combust fuels that include both diesel and hydrogen. During some operating modes, the ICE may combust only diesel, only hydrogen, or a combination thereof (e.g., during first, second, and third conditions, respectively). When hydrogen is provided, operating conditions may be adjusted to promote enhanced combustion of the hydrogen. The engine system may combust a mixture of three or more fuels including diesel, hydrogen, and ammonia. Additionally or alternatively, ethanol may be included in the combustion mixture.

In one example, systems and methods for the multi-fuel engine may include combusting a primary fuel in combination with one or more secondary fuels. The multi-fuel engine may combust the primary fuel alone. During some conditions, the multi-fuel engine may decrease an amount of primary fuel used via substituting one or more secondary fuels into a combustion mixture. The secondary fuels may include a reduced carbon-content relative to the primary fuel. Additionally or alternatively, the secondary fuels may be less expensive, more available, and/or more efficient. The secondary fuels may vary in ignitibility and burn rate. An ignition timing of the multi-fuel engine may be adjusted in response to the combustion mixture to account for inclusion of the secondary fuels. For example, the ignition timing may be retarded as an amount of hydrogen is increased. As another example, the ignition timing may be advanced as an amount of ammonia is increased. The ignition timing may be further adjusted in this way in response to addition and subtraction of the primary and one or more secondary fuels to the combustion mixture. By doing this, knock and pre-combustion may be mitigated.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, such as cars, trucks and busses. Suitable vehicles may include mining equipment, marine vessels, rail vehicles, and other off-highway vehicles (OHV). For clarity of illustration, a locomotive is provided as an example of a mobile platform/rail vehicle supporting a system incorporating an embodiment of the invention.

Before further discussion of the methods for increasing engine startup efficiency, an example platform in which the methods may be implemented is shown. FIG. 1 depicts an exemplary embodiment of a vehicle system 100 which is shown as a rail vehicle 106. The rail vehicle runs on a rail 102 via a plurality of wheels 112 and includes an engine system with an engine 104. The engine receives intake air for combustion through an intake passage 114 which receives ambient air from outside of the rail vehicle. Exhaust gas generated during combustion at the engine is supplied to an exhaust passage 116 and flows out of an exhaust stack of the rail vehicle.

The engine system includes a turbocharger 120 arranged between the intake passage and the exhaust passage. The turbocharger increases air charge of ambient air drawn in the intake passage in order to provide greater charge density during combustion to increase power output and/or engine-operating efficiency. The turbocharger may include a compressor (not shown in FIG. 1) which is at least partially driven by a turbine (not shown in FIG. 1). While a single turbocharger is shown, the engine system may include multiple turbine and/or compressor stages. The turbine is shown in greater detail with reference to FIGS. 2-5. More specifically, implementation of a semi-floating nozzle ring for the turbine is described.

In some examples, the vehicle system may further include an exhaust gas treatment system coupled in the exhaust passage upstream or downstream of the turbocharger. For example, the exhaust gas treatment system may include a diesel oxidation catalyst (DOC) and a diesel particulate filter (DPF), as well as one or more emission control devices. The emission control devices may include a selective catalyst reduction (SCR) catalyst, a three-way catalyst, a NOx trap, etc.

The rail vehicle also includes a controller 148 to control various components related to the vehicle system. In one example, the controller includes a computer control system and computer readable storage media including code for enabling on-board monitoring and control of vehicle operation. The controller, while overseeing control and management of the vehicle system, may receive signals from a variety of engine sensors 150 in order to determine operating parameters and operating conditions, and correspondingly adjust various engine actuators 152 to control operation of the rail vehicle.

Figure 4:
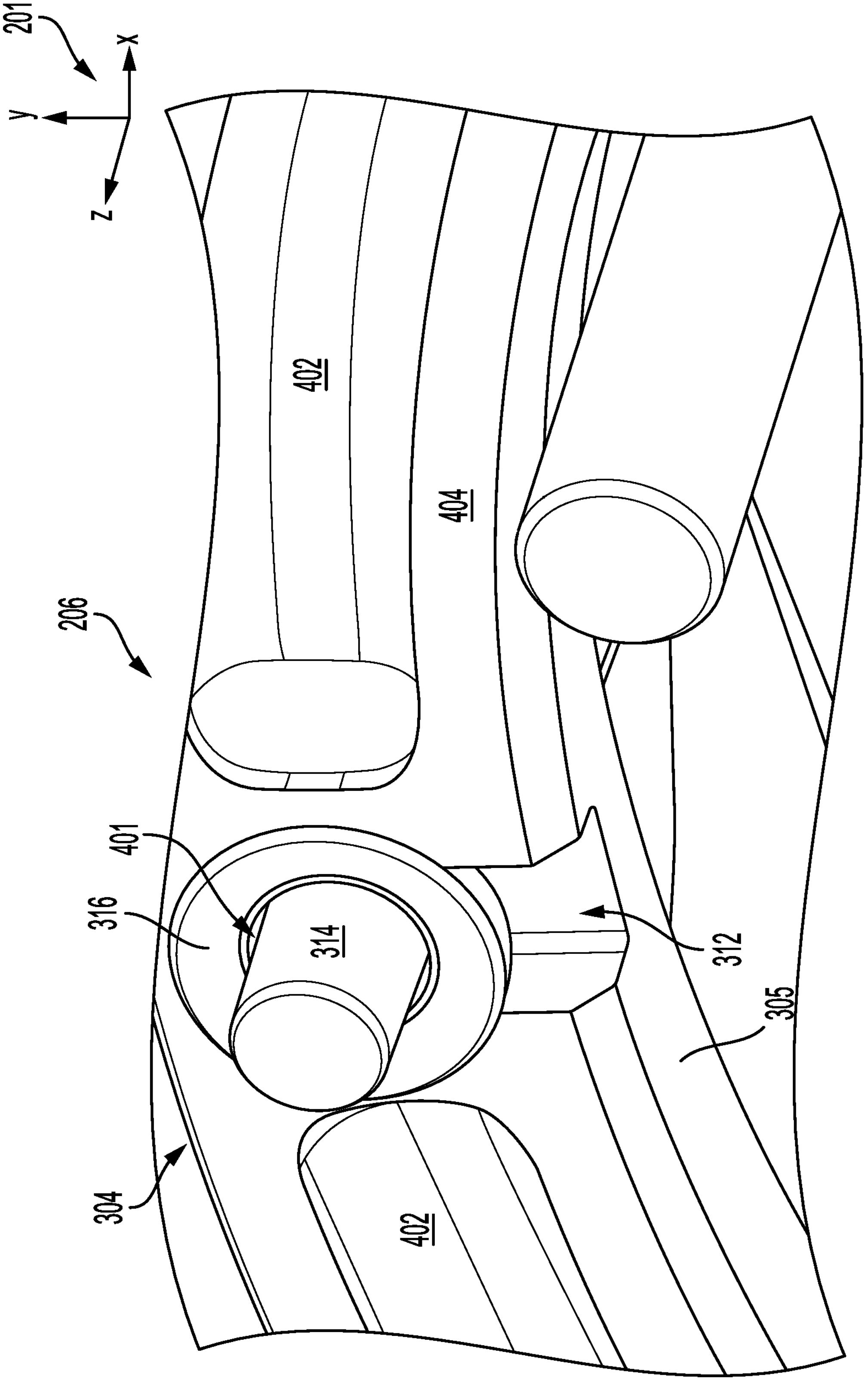
FIG. 4 shows a detailed, perspective view of a portion of a semi-floating nozzle ring of the turbine.
Figure 5:
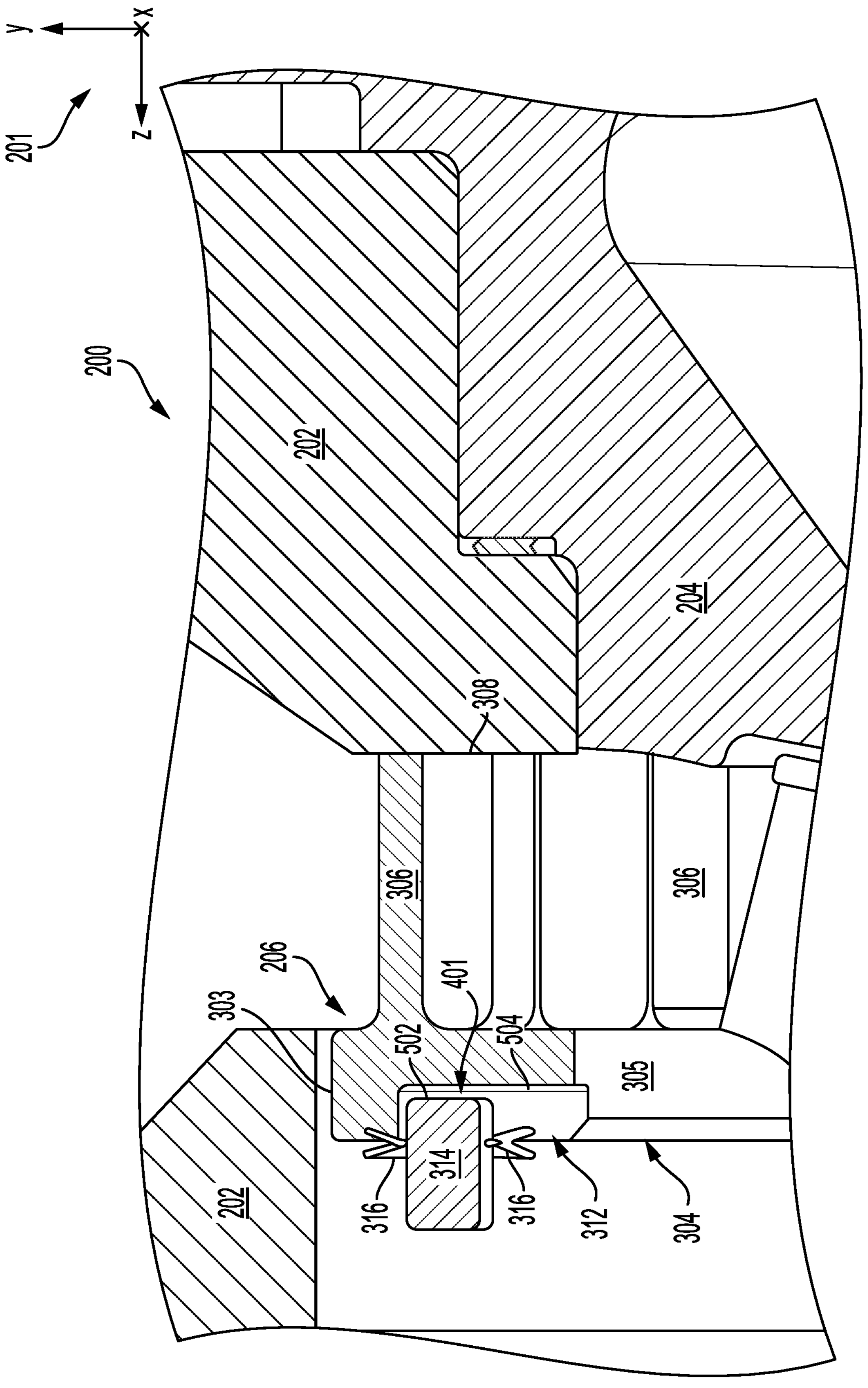
FIG. 5 shows a cut-away view of a portion of the turbine, showing details of an anti-rotation structure of the semi-floating nozzle ring.

As described above, a turbocharger for a vehicle may include at least one turbine harnessing exhaust gas energy and convert the harnessed energy into rotation of a compressor coupled to the turbine by a shaft. Components of the turbocharger may be formed of a metal, such as stainless steel, aluminum, etc. The turbine may be included in a radial turbocharger and an embodiment of a turbine is shown FIG. 2 in a partial cut-away view. Further details of the turbine are shown in a cut-away views in FIGS. 3A-3B, where the turbine includes a semi-floating nozzle ring. A portion of the semi-floating nozzle ring is depicted in FIG. 4, showing details of an anti-rotation structure. A relative positioning of the anti-rotation structure is illustrated in FIG. 5 in a different cut-away view of the turbine.

Figure 2:
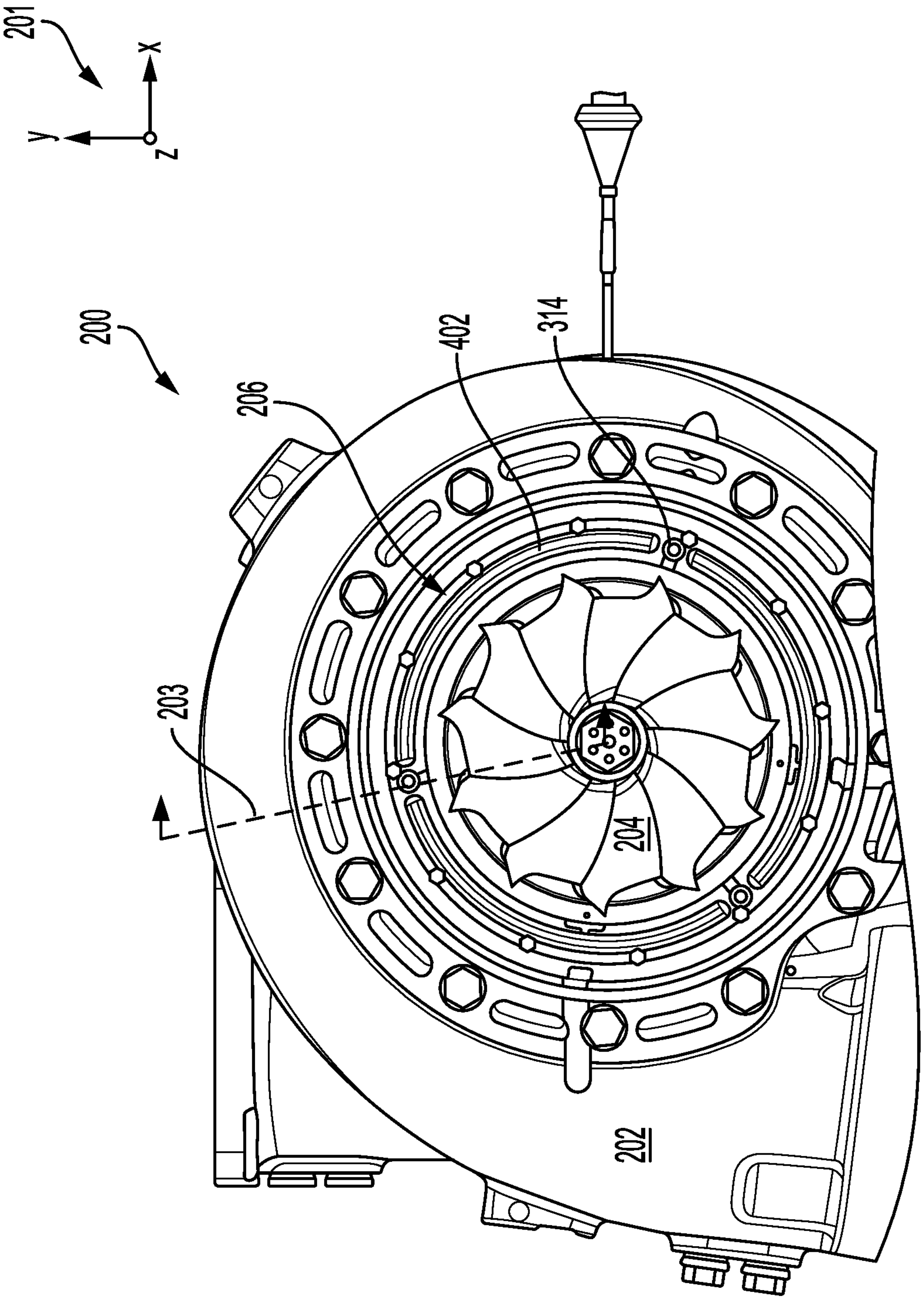
FIG. 2. shows an embodiment of a turbine which may be included in the turbocharger of FIG. 1.

Turning to FIG. 2, a turbine 200 of a radial turbocharger is depicted. A set of reference axes 201 are provided, indicating a y-axis, an x-axis, and a z-axis. In one example, the y-axis may be parallel with a vertical direction, the x-axis parallel with a lateral direction, and the z-axis parallel with a longitudinal direction of a radial turbocharger.

Figure 3A:
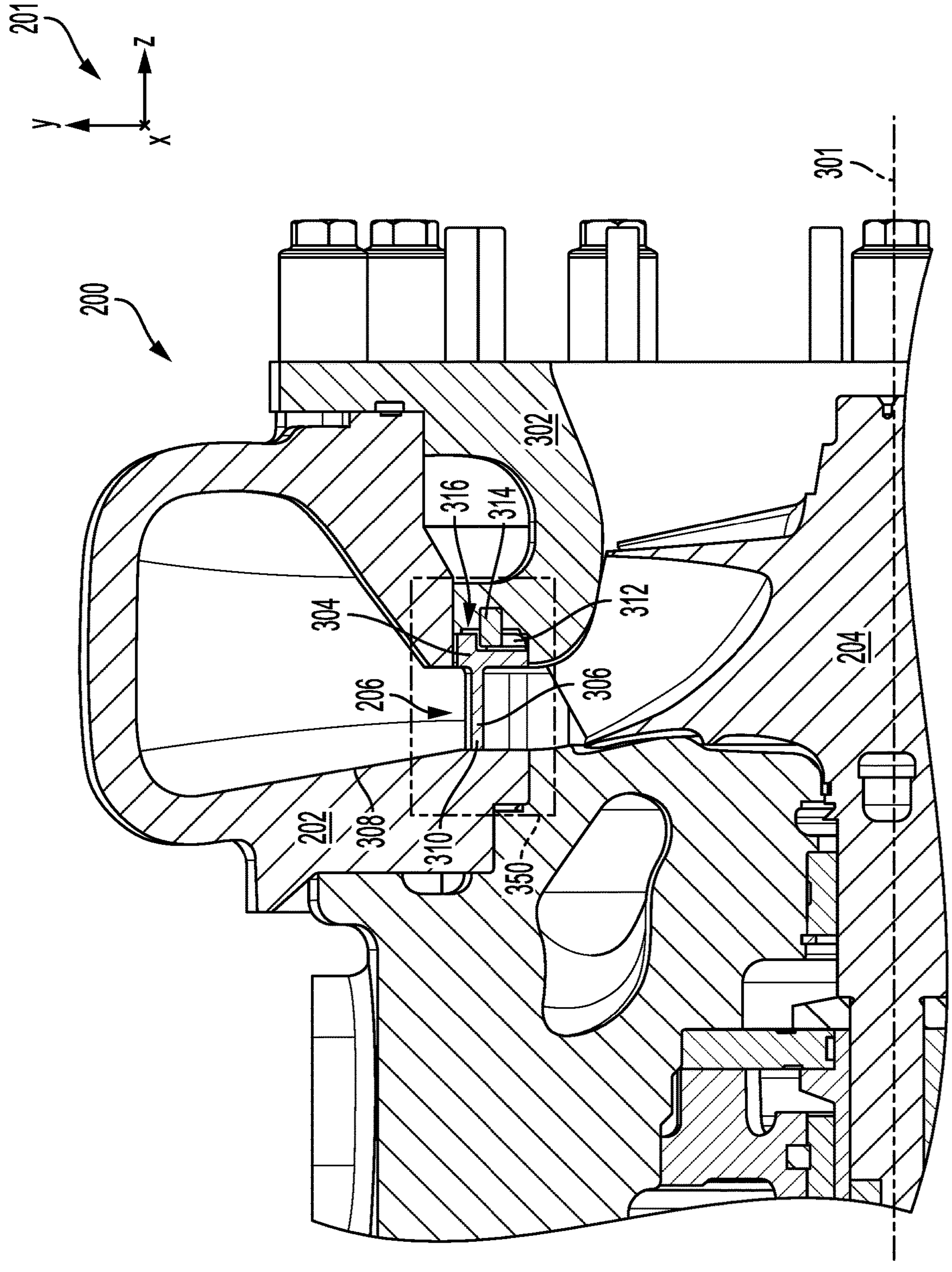
FIG. 3A shows a detailed, cut-away view of a portion of the turbine.
Figure 3B:
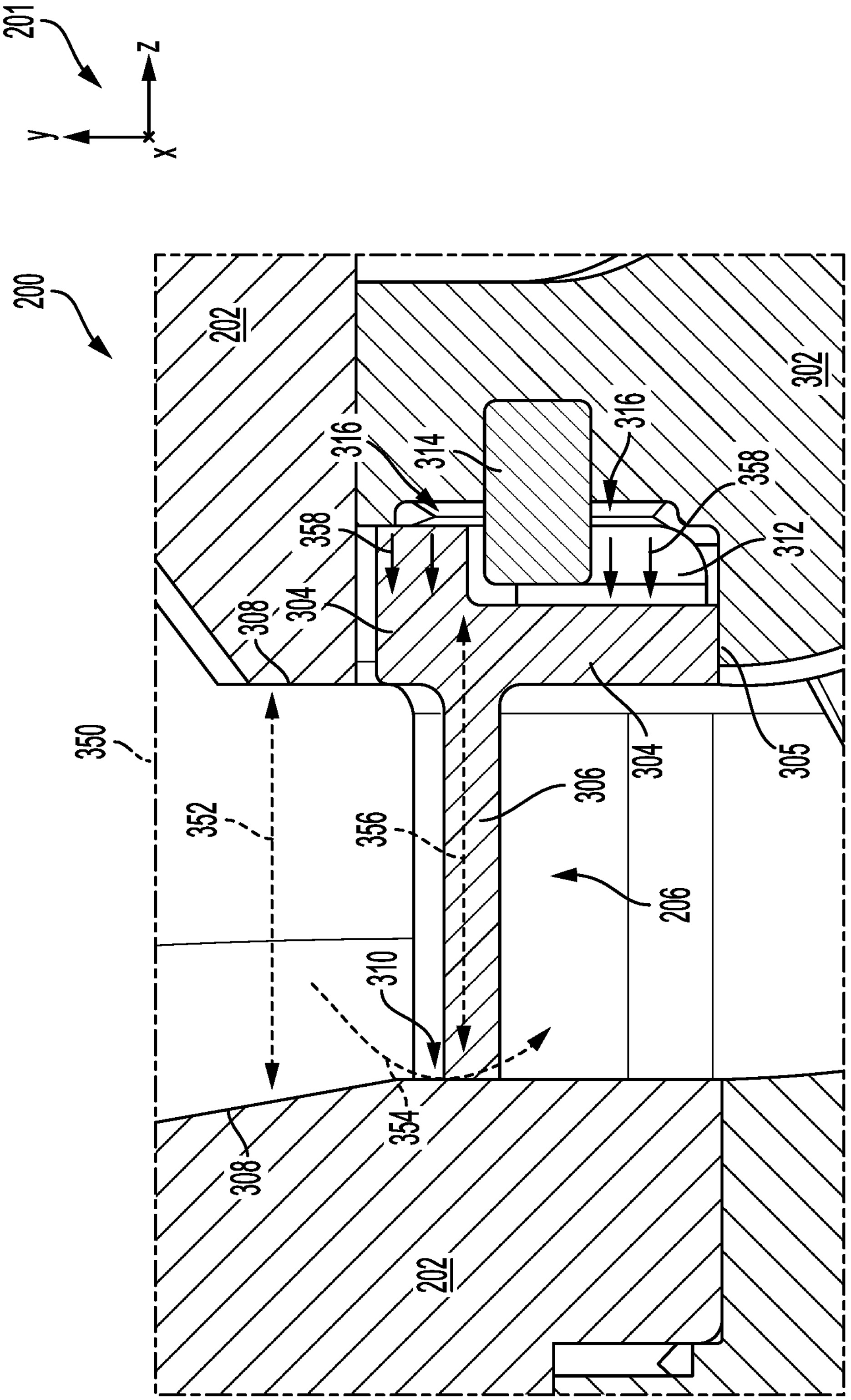
FIG. 3B shows a magnification of a portion of the view illustrated in FIG. 3A.

As shown in FIG. 2 and in a cut-away view of the turbine of FIGS. 3A-3B (cut along line 203 indicated in FIG. 2), the turbine has a volute 202, a turbine wheel 204, and a vaned nozzle ring 206, where the volute circumferentially surrounds the turbine wheel and at least a portion of the nozzle ring is positioned in the volute at an interface between the volute and a turbine shroud 302. The cut-away profile depicts the turbine sliced through a slot 312 of the nozzle ring, the slot shown more clearly in FIG. 4 and discussed further below. As illustrated in FIG. 3A, the nozzle ring may have a ring-shaped vane base 304 that is centered about the turbine wheel and about a central axis of rotation 301 of the turbine. In one example, as shown and described herein, the nozzle ring may be a semi-floating open vane nozzle ring with vanes 306 extending from the vane base along the z-axis. Further, the vanes may extend across an inner volume of the volute, e.g., across a distance between oppositely arranged walls of the volute. The vanes may have a fixed geometry, in one example, and may form a single continuous unit with the vane base.

The nozzle ring may be formed of a rigid, durable material that is prone to expansion when exposed to heat. For example, the nozzle ring may be formed of stainless steel, aluminum, or another metal alloy. As indicated in FIG. 3B, the nozzle ring has an outer surface 303 that defines an outermost circumference of the vane base and an inner surface 305 that defines an innermost circumference of the vane base. The outer surface of the vane base may be in contact with the volute while the inner surface of the vane base may be in contact with the turbine shroud.

The vanes extend along the z-axis between the vane base and a volute wall 308. The vanes have vane tips 310 that contact the volute wall. When the turbocharger is operated and the turbine increases in temperature, the vanes may expand in an axial direction, e.g., along the z-axis. Axial expansion of the vanes may cause the vane tips to press against the volute wall and the vane base to press against the turbine shroud, along the z-axis. Additionally, expansion of the volute may occur which may cause leakage and loss of exhaust pressure in the turbine.

For example, a magnified view of a portion of the turbine of FIG. 3A, as indicated by dashed rectangle 350 is shown in FIG. 3B to illustrate heat-induced expansion in the turbine. During vehicle operation, exhaust gases flowing through the turbine may increase a temperature of the turbine, which may drive expansion of the volute. Expansion of the volute may increase an inner distance 352 between oppositely arranged portions of the volute wall. When the volute expands in a manner independent of expansion of the nozzle ring, the inner distance between the portions of the volute wall may become greater than a length of the vanes (the length defined along the z-axis). As a result, a gap may be formed between the vane tips and a portion of the volute wall that would otherwise be in contact with the vane tips. The gap may provide clearance through which exhaust gases may escape from the volute, as indicated by arrow 354, reducing an exhaust pressure transferred to the turbine wheel.

The nozzle vane may also undergo heat-driven expansion, causing the vanes to expand at least along their lengths (e.g., axially), as indicated by arrow 356. In some instances, the vanes may expand axially such that the length of the vanes is equal to or greater than the inner distance between the oppositely arranged portions of the volute wall. The expansion of the vanes may cause the vane tips to press into the volute wall and the vane base to press into the turbine shroud.

Stress, such as compressive stress, may be placed on the vanes when the vanes expand. In some examples, when axial growth of the vanes drives the vanes tips into the volute wall, particularly during transient operation of the turbocharger, a structural integrity of the vanes may be challenged. Utilization of vanes with an initial length (e.g., a length when the vanes are not heated) that compensates for thermal expansion, such as vanes with initial lengths shorter than the inner distance between the oppositely arranged portions of the volute wall, however, may exacerbate exhaust leakage when the vanes are not heated and expanded. Loss of exhaust pressure due to leakage via clearance between the vane tips and the volute wall may reduce a stage efficiency of the turbine. The leakage may be present during steady-state operation of the turbocharger.

Coupling bias devices 316 to the nozzle ring of the turbine, as illustrated in FIGS. 2-5, may be done according to an embodiment of the invention. Although adaptation of the bias devices to the turbine is described herein, the bias devices may be similarly applied to a diffusor of a compressor. Suitable bias devices may be, for example, concave or convex, flexible structures, such as Belleville washers. In one embodiment, the bias devices are crushable. Some bias devices may be coupled to one of a plurality of anti-rotation structures inhibiting rotation of the nozzle ring. However, in other examples, the bias devices may not be coupled to the plurality of anti-rotation structures. Instead, the bias devices may be seated in recesses in a surface of the nozzle ring. Alternatively, a single, large diameter bias device may be used rather than individual bias devices distributed around a circumference of the nozzle ring.

Suitable bias devices may be springs. The bias devices may deform elastically, e.g., compress with a target amount of resistance due to a compressive force, and expand automatically to return to an original geometry when the compressive force is released. Other mechanisms or devices, other than the set of Belleville washers, may be used additionally or alternatively to provide a bias, tensioning, or spring force causing the nozzle ring to shift along the z-axis. In other words, the bias devices may allow axial translation of the nozzle ring within the turbine while providing a degree of resistance to the axial translation of the nozzle ring such that the nozzle ring is subjected to an opposing force exerted by the bias devices when the vanes expand axially.

The length of the vanes may be similar to the distance between the oppositely arranged portions of the volute wall. Clearance between the vane base and the turbine shroud may be occupied by the bias devices, which may deform along the z-axis and flatten, as an example, when compressed by the nozzle ring. As an example, when the volute and the nozzle ring are at ambient temperature and not undergoing expansion, the clearance between the vane base and the turbine shroud may be at a minimum and the bias devices may be compressed by an amount that is less than a maximum compression of the bias devices (e.g., where application of the maximum compression results in the bias devices becoming fully flattened). As a result, the vane tips may press against the volute wall as compelled by the spring force of the bias devices, which may eliminate gaps between the vane tips and the volute wall without exerting an amount of force that stresses the vanes. Further, a pressure exerted on the volute wall may remain uniform, regardless of an expansion state of the vanes and operating status of the turbocharger, due to the spring force and compressibility of the bias devices.

When the volute expands and the distance between the oppositely arranged portions of the volute wall increases, a resistance of the bias devices to compression results in the bias devices exerting an axial force (e.g., a force directed along the z-axis) on the vane base, as indicated by arrows 358, which causes the vane tips to maintain contact with the volute wall. As such, the bias devices may be selected to be able to continue exerting the axial force on the nozzle ring even when the volute expands. The ability of the bias devices to maintain the axial force may be balanced with a resistance of the bias devices to compression that reduces or does not impose stress on the vanes when the volute is not expanded.

When the vanes expand, e.g., undergo axial growth, the vane base may push against the bias devices. This movement may compress the bias devices and mitigate increased exertion of force on the volute wall by the vane tips. Compression of the bias devices allows axial translation of the vane base to accommodate the axial growth of the vanes. In one example, compression of the bias devices absorbs axial forces applied by the vane tips that may otherwise be exerted against the volute wall. The bias devices therefore may buffer the effects of thermally-induced expansion of the vanes.

Furthermore, as gas contacts the vanes of the nozzle ring, a rotational force may be exerted on the nozzle ring, compelling the nozzle ring to rotate. To inhibit rotation of the nozzle ring, one or more anti-rotation structures 314 may be coupled to the vane base of the nozzle ring. In one example, the anti-rotation structures may be pins, as shown in FIGS. 2-5. In other examples, the anti-rotation structures may be tabs integrated into the nozzle ring to interface with slots in the turbine shroud and/or tabs integrated into the turbine shroud to interface with slots in the nozzle ring. For example, the nozzle ring or the turbine shroud may be cast or machined with the tabs. Although the anti-rotation structures anchor the vane base against rotational movement of the nozzle ring, the nozzle ring is able to slide axially along the anti-rotation structures. One of the anti-rotation structures is shown in greater detail in FIG. 4.

Turning now to FIG. 4, a portion of the nozzle ring is shown in a perspective view of a side of the nozzle ring that interfaces with the turbine shroud. The anti-rotation structure may be inserted into an aperture 401, e.g., a blind-hole, in the nozzle ring and may protrude outwards from the nozzle ring along the z-axis, in a direction from the vane base towards the portion of the volute wall that the vane tips contact. In other words, a first portion of the anti-rotation ring may be inserted into the blind-hole while a second portion protrudes from the blind-hole. One or more of the bias devices may circumferentially surround the anti-rotation structure, which may have an circular outer geometry, when viewed along the z-axis. However, other outer geometries have been contemplated, such as octagonal, hexagonal, etc. Further, in other examples, the bias devices may be positioned at other locations other than around the anti-rotation structure, such as in recesses of the vane base and/or recess of the turbine shroud. As another example, one or more wave washers having a diameter similar to the diameter of the nozzle ring may be centered about the z-axis (e.g., the central axis of rotation) as a single, continuous, interfacing structure between the nozzle ring and the turbine shroud, as described above.

The bias devices may be concave or convex discs with central openings through which the anti-rotation protrudes. For example, the bias devices may be disc springs or conical spring washers oriented co-planar with the volute wall (e.g., with the x-y plane). In one example, the bias devices may be formed of a metallic alloy such as stainless steel, nickel-beryllium, copper beryllium, Inconel®, steel, etc. As described above, mechanical properties, such as a spring force, of the bias devices may be selected according to an expected amount of axial force exerted by the vanes during expansion. Further, a number of bias devices coupled to each anti-rotation structure may vary depending on an anticipated amount of expansion of the vanes.

The nozzle ring may include multiple anti-rotation structures spaced evenly apart around its circumference. For example, as shown in FIG. 2, the nozzle ring may include three anti-rotation structures, although other quantities are possible. Grooves 402 depicted in FIG. 4 may form recesses in a face 404 of the vane base where each groove may extend between two of the anti-rotation structures. Each of the grooves may be shaped as a fraction of a circle, the fraction dependent on a number of anti-rotation structures included in the nozzle ring. Accordingly, a length of the grooves, as measured along the circumference of the nozzle ring, may vary depending on the quantity of anti-rotations structures incorporated in the nozzle ring. The grooves may remove material from the vane base to reduce a weight of the base and, as such, may not be included in other examples.

In addition, the face of the vane base may also include the slot, as described previously, extending from the blind-hole (e.g., in which the anti-rotation structure is inserted) to the inner surface of the vane base. The slot does not extend from the blind-hole to the outer surface of the vane base. Thermally-driven radial relative radial expansion between the vane base and the turbine shroud may be accommodated by the slot. Loading of the anti-rotation structure, which may otherwise cause binding that may inhibit axial movement of the nozzle is thereby precluded.

The anti-rotation structure may be received by a corresponding aperture in the turbine shroud, as shown in FIGS. 3A-3B. For example, a section of a length of the anti-rotation structure, the length defined along the z-axis, may be partially embedded in the corresponding aperture of the turbine shroud without any gaps between surfaces of anti-rotation structure and surfaces of the corresponding aperture. As an example, the section of the length of the anti-rotation structure that is embedded in the corresponding aperture of the turbine shroud wall may be the second portion of the anti-rotation structure that protrudes from the blind-hole, as described above. The anti-rotation structure may therefore be held stationary at least with respect to axial movement by insertion into the corresponding aperture of the turbine shroud.

As illustrated in FIG. 5, in a different cut-away view of the turbine, a clearance space may be present between an end 502 of the anti-rotation structure and a face 504 of the nozzle ring at the blind-hole, thereby allowing the nozzle ring to shift along the z-axis relative to the anti-rotation structure during expansion/contraction of the vanes. The turbine shroud is omitted in FIG. 5 for clarity and the cut-away view of FIG. 5 is sliced through the slot in which the anti-rotation structure is inserted.

By configuring the nozzle ring as the semi-floating nozzle ring, stress on the vanes may be alleviated when thermal expansion occurs. As a result, the vanes may be formed of less material, e.g., the vanes may be thinner, allowing a weight, a cost of the nozzle ring, and an amount of material used to form the nozzle ring to be reduced. As described above, an amount of spring force of the bias device may be selected to counter a compressive force exerted by the nozzle ring, the compressive force exerted in a direction along the z-axis from the volute wall to the turbine shroud. For example, the spring force of the bias device may be double the compressive force.

A turbocharger may be therefore operated with high efficiency at a turbine stage of the turbocharger by arranging bias devices between a nozzle ring and a turbine shroud. The turbine stage may include a semi-floating nozzle ring constrained to axial movement that minimizes leakage of exhaust gas flow. The bias devices may accommodate thermal expansion of the nozzle ring vanes and may reduce stress at the vanes. By enabling the semi-floating nozzle ring to maintain an open ring configuration or design, the nozzle ring may be manufactured by machining, printing, investment casting, etc. The choice of manufacturing method may affect time and/or costs.

Additionally, the bias devices and the semi-floating nozzle ring may be readily adapted to already existing radial turbochargers to increase operating efficiency. For example, for a turbocharger that already includes anti-rotation structures embedded in the turbine shroud for coupling the nozzle ring thereto, a nozzle ring with vanes of suitable length may be adapted to the turbine along with the bias devices. In examples where the anti-rotation structures are not already included, apertures may be machined into the turbine shroud to receive the anti-rotation structures. Retrofitting of the semi-floating nozzle ring and the bias devices to radial turbochargers may be achieved at low cost and without introducing additional complexity and weight.

FIGS. 2-5, inclusive, are drawn to scale, although other relative dimensions may be used.

FIGS. 2-5, inclusive, show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure describes a turbine that includes at least one bias device arranged at an interface between a nozzle ring and a turbine shroud, the at least one bias device that can exert an axial force on the nozzle ring to maintain contact between vane tips of the nozzle ring and a volute wall. In a first example of the system, the at least one bias device is a disc spring arranged co-planar with the volute wall and can deform elastically along an axial direction. In a second example of the system, optionally including the first example, the at least one bias device is arranged at one or more of circumferentially around an anti-rotation structure partially embedded in the turbine shroud, within a recess of the nozzle ring or the turbine shroud, and around a central axis of rotation of the turbine, and when the at least one bias device is arranged around the central axis of rotation of the turbine, the at least one bias device has a diameter similar to a diameter of the nozzle ring. In a third example of the system, optionally including one or both of the first and second examples, the at least one bias device has a spring force that is double that of a compressive force exerted on the at least one bias device by axial expansion of the nozzle ring. In a fourth example of the system, optionally including one or more or each of the first through third examples, axial movement of the nozzle ring is enabled by the at least one bias device. In a fifth example of the system, optionally including one or more or each of the first through fourth examples, a pressure exerted on the volute wall by the vane tips is maintained uniform during operation of the turbine. In a sixth example of the system, optionally including one or more or each of the first through fifth examples, the turbine includes a plurality of the at least one bias device distributed evenly around a circumference of the nozzle ring. In a seventh example of the system, optionally including one or more or each of the first through sixth examples, the turbine is implemented in a radial turbocharger.

The disclosure describes an open vane nozzle for a turbine that includes a plurality of vanes coupled to a vane base and protruding from the vane base along an axial direction of the turbine, one or more pins extending between blind-holes of the vane base and apertures in a turbine shroud, the one or more pins inhibiting rotation of the open vane nozzle, and at least one bias device surrounding each of the one or more pins between the vane base and the turbine shroud, the at least one bias device that can deform elastically along the axial direction and exert a spring force on the vane base. In a first example of the system, the open vane nozzle is a semi-floating nozzle ring with the plurality of vanes extending across a distance between oppositely arranged walls of a volute of the turbine. In a second example of the system, optionally including the first example, when the volute undergoes thermal expansion and the distance between the oppositely arranged walls of the volute increases, the spring force of the at least one bias device maintains contact between tips of the plurality of vanes and one of the oppositely arranged walls. In a third example of the system, optionally including one or both of the first and second examples, the plurality of vanes expands axially when exposed to heat and, when undergoing axial expansion, the plurality of vanes exerts a compressive force on the at least one bias device. In a fourth example of the system, optionally including one or more or each of the first through third examples, the at least one bias device is deformed when the plurality of vanes exerts the compressive force and deformation of the at least one bias device allows the open vane nozzle to expand axially without increasing a force applied on a volute wall by tips of the plurality of vanes. In a fifth example of the system, optionally including one or more or each of the first through fourth examples, the deformation of the at least one bias device allows axial translation of the vane base. In a sixth example of the system, optionally including one or more or each of the first through fifth examples, the one of more pins are maintained stationary by embedding of a portion of the one or more pins in the apertures of the turbine shroud, and the open vane nozzle slides axially along the one or more pins.

The disclosure describes a radial turbocharger that includes a volute circumferentially surrounding a turbine wheel, a semi-floating nozzle ring arranged at an interface between the volute and a turbine shroud, the semi-floating nozzle ring including vanes coupled to a vane base and oriented with the vane base proximate to the turbine shroud and tips of the vanes in contact with an inner wall of the volute, a plurality of bias devices arranged between the semi-floating nozzle ring and the turbine shroud to apply a spring force on the semi-floating nozzle ring along a central axis of the radial turbocharger, and one or more pins anchoring the semi-floating nozzle ring in place relative to rotation about the central axis. In a first example of the system, the plurality of bias devices is also included in a compressor of the radial turbocharger. In a second example of the system, optionally including the first example, the semi-floating nozzle ring includes slots extend along a face of the semi-floating nozzle ring between blind-holes in the vane base and an inner surface of the vane base. In a third example of the system, optionally including one or both of the first and second examples, a clearance space is present between ends of the one or more pins and surfaces of the vane base. In a fourth example of the system, optionally including one or more or each of the first through third examples, exhaust gas does not flow between tips of the vanes and the inner wall of the volute.

As used herein, an element or step recited in the singular and proceeded with the word "a" or "an" do not exclude plural of said elements or steps, unless such exclusion is indicated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects. As used herein, the term "approximately" is means plus or minus five percent of a given value or range unless otherwise indicated.

This written description uses examples to disclose the invention, including the best mode, and also to enable a person of ordinary skill in the relevant art to practice the invention, including making and using devices or systems and performing the incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbine, comprising:

a volute circumferentially surrounding a turbine wheel;

a semi-floating nozzle ring in contact with the volute and a turbine shroud, the semi-floating nozzle ring including vanes coupled to a vane base and the vanes are oriented with the vane base proximate to the turbine shroud, where tips of the vanes are in contact with a volute wall;

a plurality of bias devices arranged between the semi-floating nozzle ring and the turbine shroud to apply a spring force on the semi-floating nozzle ring along a central axis of the turbine, wherein the plurality of bias devices are flexible structures; and one or more pins anchoring the semi-floating nozzle ring in place relative to a rotation about the central axis via extending through one or more apertures respectively of the semi-floating nozzle ring in a direction from the vane base toward the portion of the volute wall that the tips of the vanes contact, wherein each of the one or more pins is surrounded by and extends through a respective one of the plurality of bias devices.

2. The turbine of claim 1, wherein each of the plurality of bias devices is a disc spring.

3. The turbine of claim 1, wherein the semi-floating nozzle ring includes slots, and the slots extend along a face of the semi-floating nozzle ring between apertures in the vane base and an innermost circumference of the vane base.

4. The turbine of claim 1, wherein a gap is between one or more of the tips of the vanes and a portion of the volute wall.

5. The turbine of claim 1, wherein exhaust gas does not flow between the tips of the vanes and the volute wall.

* * * * *